(12) United States Patent
Ferhan et al.

(10) Patent No.: US 10,775,348 B2
(45) Date of Patent: Sep. 15, 2020

(54) SYSTEM FOR MEASURING A PARAMETER OF A FLUID IN A TANK

(71) Applicant: Plastic Omnium Advanced Innovation and Research, Brussels (BE)

(72) Inventors: Mehdi Ferhan, Paris (FR); Francois Francini, Compiegne (FR); Yacouba Sanogo, Troy, MI (US)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/634,718

(22) PCT Filed: Jul. 27, 2018

(86) PCT No.: PCT/EP2018/070374
§ 371 (c)(1),
(2) Date: Jan. 28, 2020

(87) PCT Pub. No.: WO2019/025300
PCT Pub. Date: Feb. 7, 2019

(65) Prior Publication Data
US 2020/0200711 A1    Jun. 25, 2020

(30) Foreign Application Priority Data

Jul. 31, 2017 (FR) .................................... 17 57319

(51) Int. Cl.
*G01N 29/024* (2006.01)
*B60K 15/03* (2006.01)
*G01F 23/296* (2006.01)

(52) U.S. Cl.
CPC .......... *G01N 29/024* (2013.01); *B60K 15/03* (2013.01); *G01F 23/2962* (2013.01);
(Continued)

(58) Field of Classification Search
CPC .. G01N 2291/011; G01N 29/02; G01N 29/07; G01N 29/024
(Continued)

(56) References Cited

U.S. PATENT DOCUMENTS 5,522,428 A      6/1996  Duvall
2010/0001851 A1  1/2010  Handa
(Continued)

FOREIGN PATENT DOCUMENTS

DE       103 54 473 A1      6/2005
DE    10 2012 217 891 A1    4/2014
(Continued)

OTHER PUBLICATIONS

International Search Report dated Oct. 19, 2018 in PCT/EP2018/070374 filed on Jul. 27, 2018, 3 pages.

*Primary Examiner* — Nimeshkumar D Patel
*Assistant Examiner* — Jean F Morello
(74) *Attorney, Agent, or Firm* — Oblon, McClelland, Maier & Neustadt, L.L.P.

(57) ABSTRACT

The invention concerns a tank (1) of fluid (4) for a motor vehicle (3), comprising a body (5) arranged to receive the fluid (4) and a system (9) for measuring a parameter of the fluid (4) in the tank (1) from an acoustic wave. According to the invention, the acoustic wave (6) is generated by another system (7), the main function of which is not that of emitting an acoustic wave.

14 Claims, 2 Drawing Sheets

(52) U.S. Cl.
CPC .............. *B60K 2015/03217* (2013.01); *G01N 2291/011* (2013.01); *G01N 2291/02809* (2013.01)

(58) Field of Classification Search
USPC .......................................................... 73/584
See application file for complete search history.

(56) References Cited

U.S. PATENT DOCUMENTS

2012/0146805 A1* 6/2012 Vick, Jr. ................. E21B 34/14
340/853.2
2016/0369623 A1* 12/2016 Ahmad .................. G01N 29/02
2017/0122914 A1* 5/2017 Warner ................ G01N 29/032

FOREIGN PATENT DOCUMENTS

| FR | 3 035 965 A1 | 11/2016 |
| JP | 7-77477 A | 3/1995 |
| WO | WO 2013/014200 A1 | 1/2013 |

* cited by examiner

SYSTEM FOR MEASURING A PARAMETER OF A FLUID IN A TANK

TECHNICAL FIELD OF THE INVENTION

The present invention concerns a system for measuring a parameter of a fluid in a tank of a motor vehicle such as the level and/or concentration.

TECHNICAL BACKGROUND TO THE INVENTION

Fuel tanks comprise a fuel level detector to determine the volume remaining in the tank. The level detector can also be coupled to a fuel concentration detector. Each detection can be performed, for example, acoustically. An ultrasound emitter can thus generate waves that are reflected by the upper surface of the fuel then captured by an ultrasound receiver that makes it possible to determine, depending on the time elapsed between emission and receipt, the height of the fuel in the tank. A similar principle also makes it possible to determine the variations of concentration from a constant wave path.

These detectors use considerable electrical energy and involve the use of an emitter/receiver assembly which increases not only the weight of the tank, and incidentally of the motor vehicle, but also the cost of the components.

SUMMARY OF THE INVENTION

The object of the invention is to overcome these drawbacks by proposing a measuring system guaranteeing the same level of reliability while reducing energy consumption and the necessary mass.

To this end, the invention concerns a tank of fluid for a motor vehicle characterized in that it comprises a body arranged to receive the fluid and a system for measuring a parameter of the fluid in the tank based on an acoustic wave, the measuring system comprising at least one acoustic sensor designed to capture an acoustic wave, called noise, generated by another system, the main function of which is not that of emitting an acoustic wave.

Advantageously, according to the invention, the measuring system does not comprise a sound emitter but uses another system already present in the tank or around the tank to generate the acoustic waves intended to measure the level and concentration of the fluid in the tank. It will therefore be understood that the measurement can be made when the other system is in operation or by controlling this other system at a chosen moment. This makes it possible not to reduce the quality of the measurements while requiring fewer elements for detections so as to consume less energy and weigh less. Alternatively, for the same weight, it becomes possible to incorporate new functions. Lastly, this enables a simplification of assembly by having one less emitter to be fitted and connected.

According to other optional characteristics of embodiment of the invention:
- the other system is a system for extracting fluid out of the tank, which makes it possible to use a system already present submerged in the fluid of the tank;
- the measuring system captures the acoustic waves generated by a pump of the extraction system and transmitted in the fluid, which advantageously makes it possible to offer a sufficient acoustic wave;
- the measuring system captures the acoustic waves generated by a valve of the extraction system and transmitted in the fluid, which advantageously makes it possible to offer an acoustic wave when there is no pump as with pressurized fluids;
- the measuring system comprises a device for detecting the concentration of the fluid comprising an acoustic reflection element mounted at a fixed distance in relation to the other system, at least one acoustic sensor mounted between the reflection element and the other system in order to capture the acoustic waves generated by the other system and a calculation module arranged to determine the concentration of the fluid, which advantageously makes it possible to follow the variations in duration of the acoustic waves in relation to a same fixed distance travelled;
- the acoustic reflection element is formed by the body of the tank, which makes it possible not to have to add additional parts, or a plate mounted in the tank;
- the calculation module comprises means to determine, based on the fixed distance, the type of fluid and the time elapsed between the detections of each acoustic wave generated by the other system and its echo sent back by the reflection element, the concentration of the fluid, which makes it possible to follow the variations in nature or phase of the fluid;
- the measuring system comprises a device for detecting the level of the fluid comprising the acoustic sensor mounted in the tank in order to capture the acoustic waves generated by the other system and a calculation module arranged in order to determine the level of the fluid, which advantageously makes it possible to follow the variations in height of the fluid in the tank and thus the remaining volume in the tank;
- the calculation module comprises means to determine, based on the type of fluid and the time elapsed between the detections of each acoustic wave generated by the other system and on its echo reflected by the upper surface of the fluid, the level of the fluid in the tank, which makes it possible to follow the variations in height of the fluid without the need for a reflecting float or a plurality of sensors;
- the measuring system comprises a first acoustic sensor mounted on the bottom of the tank, a second acoustic sensor mounted at the top of the tank, the calculation module comprising means to determine, based on the distance between the first and second acoustic sensors, the type of fluid, the type of filling gas and the time elapsed between the detection of the first acoustic sensor and the second acoustic sensor for each acoustic wave generated by the other system, the level of the fluid in the tank, which advantageously makes it possible to follow the variations in height of the fluid in the tank and therefore the volume remaining in the tank;
- the measuring system comprises several acoustic sensors mounted in the tank in order to capture in several places the acoustic waves generated by the other system and a calculation module arranged in order to determine the level and/or the concentrations of the fluid, which makes it possible to follow the variations in the nature or phase of the fluid in several places of the tank and/or to follow the remaining in the tank by taking into account the variations in nature or phase of the fluid in several places of the tank;
- the acoustic sensors are mounted at a set distance and orientation in relation to one another, the calculation module comprising means to determine, based on the distance and orientation between the acoustic sensors, on the type of fluid and the time elapsed between the detections of the acoustic sensors for each acoustic wave generated by the other system, the level and/or the concentrations of the fluid in the tank, which makes it possible to determine a spatial modeling of the fluid in the tank;

the acoustic sensors are aligned at a constant distance from one another, which makes it possible to determine a spatial modeling according to predetermined parallel planes.

Moreover, the invention relates to a motor vehicle characterized in that it comprises a tank as described above. More precisely, the tank can, for example, be a fuel tank for a thermal engine, a tank for additive for the fuel of a thermal engine, a tank for product for the depollution of the exhaust gas of a thermal engine or a fuel tank for a fuel cell.

Lastly, the invention relates to a method for measuring a parameter of fluid contained in a tank for a motor vehicle, characterized in that it comprises the following steps:

capturing an acoustic wave, called noise, propagating in the fluid and generated by a system, the main function of which is not that of emitting an acoustic wave;

determining the parameter of the fluid based on a value measured on the basis of the captured acoustic wave.

BRIEF DESCRIPTION OF THE DRAWINGS

Further features and advantages will emerge clearly from the following description, given by way of non-limiting example, with reference to the accompanying drawings, in which.

DETAILED DESCRIPTION OF AT LEAST ONE EMBODIMENT OF THE INVENTION

Figure 1:
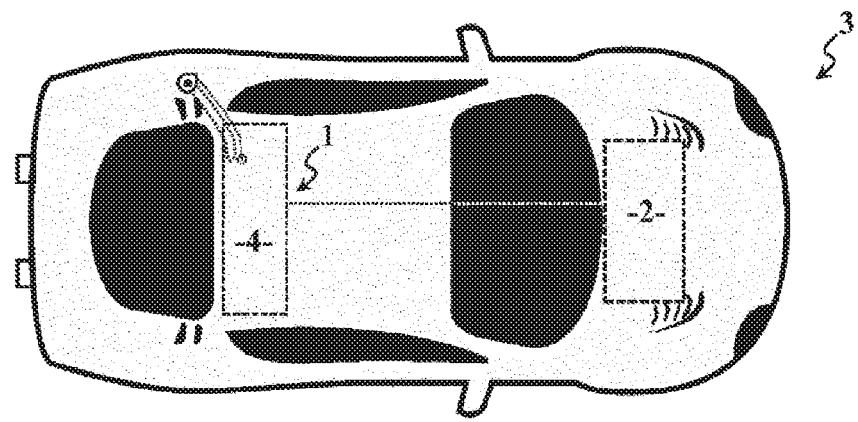
FIG. 1 is a schematic top view of a motor vehicle fitted with a tank according to the invention.

In the different Figures, identical or similar elements bear the same reference numerals, possibly with an index added. The description of their structure and their function is therefore not systematically repeated.

In what follows, the orientations are the conventional orientations of a motor vehicle. In particular, the terms "upper", "lower", "left", "right", "above", "below", "forwards" and "backwards" are understood generally in relation to the normal direction of travel of the motor vehicle and to the position of the driver.

As shown in FIG. 1, the invention concerns a tank 1 designed to be fitted in a motor vehicle 3. By way of non-limiting example, the tank 1 can thus be a fuel tank for a thermal engine 2, a tank for additive for the fuel of a thermal engine 2, a tank for product for the depollution of the exhaust gas of a thermal engine 2, a water tank for the intake (air or air/fuel mixture) of a thermal engine 2 or a fuel tank for a fuel cell. It will therefore be understood that the fluid 4 can be fuel such as petrol or diesel, cerin, urea, ammonia, demineralized water or hydrogen.

Figure 2:
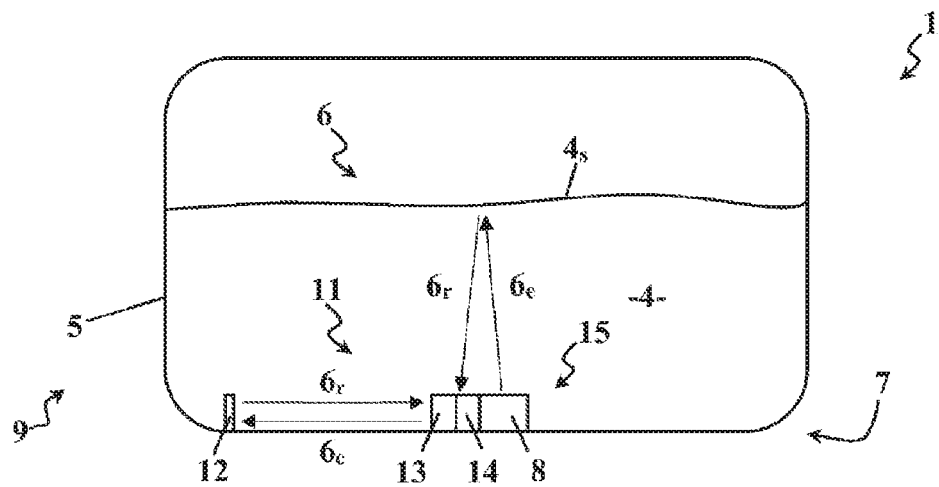
FIG. 2 is a cross-sectional schematic view of a first embodiment of a tank according to the invention.

In a first embodiment shown in FIG. 2, the tank 1 of fluid 4 comprises a body 5 arranged to receive the fluid 4. The tank 1 comprises a system 7 for the extraction of the fluid 4 from the tank 1 in order to be used in the motor vehicle 3. The extraction system 7 can in particular comprise a pumping device provided with a pump 8 operated by a motor and a control valve.

Furthermore, the tank 1 also comprises a system 9 for measuring a parameter of the fluid 4 in the tank 1 in order to control the use of the fluid 4 in the motor vehicle 3. Advantageously according to the invention, the measuring system 9 is arranged to capture acoustic waves 6 generated by another system, the main function of which is not that of emitting an acoustic wave 6, in order to determine, for example, the level and/or the concentration and/or the density and/or the pollution (degree of purity) and/or the conductivity of the fluid 4 in the tank 1. By way of non-limiting example, in the description below, the other system used will be the extraction system 7 in the fluid 4.

More precisely, the measuring system 9 makes it possible to capture the movements of molecules in the fluid 4, the variations of speed of molecules in the fluid 4, the variations of density in the fluid 4 or the variations of pressure in the fluid 4 caused by the acoustic waves 6 generated by the extraction system 7.

By way of non-limiting example, the acoustic waves 6 could thus be generated by the operation of the pump 8, its motor, the valve or any other element of the extraction system 7. It will therefore be understood that the measuring system 9 can be used when the extraction system 7 is in operation or controlling the operation of the extraction system 7 at a chosen moment.

In the example shown in FIG. 2, the first embodiment uses the pump 8 as the generator of acoustic waves 6. The measuring system 9 comprises a device 11 for detecting the concentration of the fluid 4. The device 11 preferably comprises a reflection element 12 mounted at a fixed distance in relation to the extraction system 7 in order to know in advance the distance that will be travelled by the acoustic waves 6 generated by the extraction system 7 in the fluid 4. The element 12 can thus be formed by a plate mounted projecting into the tank 1. However, depending on the geometry of the tank 1, the reflection element 12 can alternatively be formed by a part of the body 5 of the tank 1.

Moreover, the device 11 comprises at least one acoustic sensor 13 mounted between the reflection element 12 and the extraction system 7 in order to capture the acoustic waves $6_e$ emitted by the extraction system 7 as well as their echo, that is to say the acoustic waves $6_r$ reflected by the reflection element 12. When the acoustic waves 6 are generated by the pump 8 of the extraction system 7, the acoustic sensors 13 are preferably broad- or narrow-frequency band ultrasonic receivers.

Lastly, the device 11 comprises a calculation module 14 arranged to determine the concentration of the fluid 4. More precisely, the calculation module 14 determines, from the fixed distance, the type of fluid and the time elapsed between the detections of each acoustic wave $6_e$ emitted by the extraction system 7 and from its echo $6_r$ sent back by the reflection element 12, the concentration of the fluid 4. In fact, the variation of time taken to travel the fixed distance makes it possible to monitor the variations in concentration of the fluid 4. Clearly, a prior calibration depending on the arrangement of the tank 1, the fixed distance and the type of fluid 4 enables the calculation module 14 to precisely measure the actual concentration and to adapt itself to any variations in manufacture that may exist for the same type of tank 1.

By way of non-limiting example, a correlation table could, for example, be previously stored in the memory of the sensor 13 that determines the value of the concentration of the fluid 4 by interpolation or comparison. Thus, the concentration is proportional to the time between the emission and receipt of the acoustic wave 6, over a fixed distance, propagated in the medium.

In the example shown in FIG. 2, the measuring system 9 also comprises, according to the first embodiment, a device 15 for detecting the level of the fluid 4 comprising at least one acoustic sensor 13 mounted in the tank 1 in order to capture the acoustic waves $6_e$ emitted by the extraction system 7 as well as their echo, that is to say, the acoustic waves $6_r$ reflected by the upper surface $4_s$ of the fluid 4. In fact, as the upper part of the tank 1 mainly comprises a filling gas such as air or a mixture of a filling gas and another phase of the fluid 4, the acoustic wave $6_e$ emitted will be mainly reflected $6_r$ and thus return to the sensor 13.

Moreover, the device 15 comprises a calculation module 14 arranged to determine the level of the fluid 4, that is to say the height of the upper surface $4_s$ of the fluid 4 in the tank 1. More precisely, the calculation module 14 determines, based on the type of fluid and the time elapsed between the detections of each acoustic wave $6_e$ generated by the extraction system 7 and its echo $6_r$ sent back by the upper surface $4_s$ of the fluid 4, the distance travelled and thus the level of the fluid 4 in the tanks 1. In fact, the variation in time to travel back and forth enables the variations in the level of the fluid 4 to be monitored. Clearly, a prior calibration based on the arrangement of the tank 1, the concentration of the fluid 4 and the type of fluid 4 enables the calculation module 14 to precisely measure the actual level and to adapt itself to any variations in manufacture that may exist for the same type of tank 1.

By way of a non-limiting example and in a manner similar to determining the concentration of the fluid 4, the level of the fluid 4 is equal to the product of the speed of its sound in the medium and the time between the emission and receipt of the acoustic wave 6. As the speed of sound in a medium is sensitive to the density of the medium and therefore to the concentration, a concentration compensation is required in order to guarantee detection performance.

It will therefore be understood that the devices 11, 15 for detecting the concentration and the level of the fluid 4 of the system 9 can be linked in their operation, and even share one in the same sensor 13. It will therefore be immediately realized that the invention makes it possible, without reducing the quality of the measurements, to use fewer elements to perform detections so as to consume less energy and weigh less.

Figure 3:
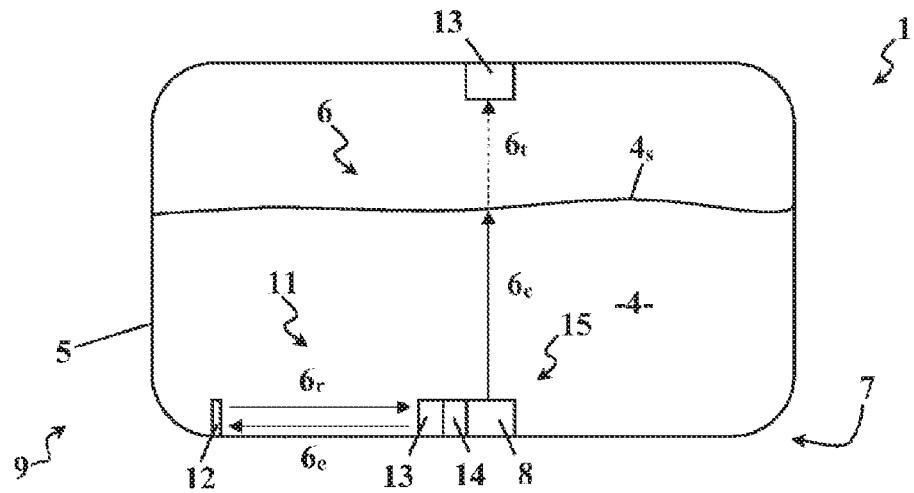
FIG. 3 is a cross-sectional schematic view of a second embodiment of the tank according to the invention.

In a second embodiment shown in FIG. 3, the tank 1 of fluid 4 comprises a body 5 arranged to receive the fluid 4. The tank 1 also comprises a system 7 for extracting the fluid 4 from the tank 1 in order to be used in the motor vehicle 3 identical to that of the first embodiment. Furthermore, the tank 1 also comprises a system 9 for measuring a parameter of the fluid 4 in the tank 1 in order to control the use of the fluid 4 in the motor vehicle 3. Advantageously according to the invention, the measuring system 9 is arranged to capture acoustic waves 6 generated by another system, the main function of which is not that of emitting an acoustic wave 6, in order to determine, for example, the level and/or the concentration of the fluid 4 in the tank 1. By way of non-limiting example, in the description below, the other system used will be the extraction system 7 in the fluid 4.

More precisely, the measuring system 9 makes it possible to capture the movements of molecules in the fluid 4, the variations of speed of molecules in the fluid 4, the variations of density in the fluid 4 or the variations of pressure in the fluid 4 caused by the acoustic waves 6 generated by the extraction system 7.

By way of non-limiting example, the acoustic waves 6 could thus be generated by the operation of the pump 8, its motor, the valve or any other element of the extraction system 7. It will therefore be understood that the measuring system 9 can be used when the extraction system 7 is in operation or controlling the operation of the extraction system 7 at a chosen moment.

In the example shown in FIG. 3, the second embodiment uses the pump 8 as a generator of acoustic waves 6. The measuring system 9 comprises a device 11 for detecting the concentration of the fluid 4 identical to that of the first embodiment with the same effects and advantages in order to precisely measure the actual concentration of the fluid 4 in the tank 1.

In the example shown in FIG. 3, the measuring system 9 also comprises, according to the second embodiment, a device 15 for detecting the level of the fluid 4 comprising at least two acoustic sensors 13 mounted in the tank 1 in order to capture the acoustic waves $6_e$ emitted by the extraction system 7 as well as the acoustic waves $6_t$ transmitted through the upper surface $4_s$ of the fluid 4. In fact, as the upper part of the tank 1 mainly comprises a filling gas such as air or a mixture of filling gas and another phase of the fluid 4, the acoustic wave $6_e$ emitted will be partially transmitted $6_t$ and thus arrive at the second sensor 13.

Moreover, the device 15 comprises a calculation module 14 arranged to determine the level of the fluid 4, that is to say the height of the upper surface $4_s$ of the fluid 4 in the tank 1. More precisely, the calculation module 14 determines, based on the distance between the first and second acoustic sensors 13, on the type of fluid, on the type of filling gas, on the time elapsed between the detection of the first acoustic sensor 13 and the second acoustic sensor 13 for each acoustic wave generated by the extraction system 7, the level of the fluid 4 in the tank and therefore the level of fluid 4 in the tank 1. In fact, the variation in time between the detections of the first and second acoustic sensors 13 makes it possible to monitor the variations in the level of the fluid 4. Clearly, a prior calibration based on the arrangement of the tank 1, the concentration of the fluid 4, the type of filling gas and the type of fluid 4 enables the calculation module 14 to precisely measure the actual level and adapt itself to any variations in manufacture that may exist for the same type of tank 1.

It will therefore be understood that the devices 11, 15 for detecting the concentration and the level of the fluid 4 of the system 9 can be linked in their operation, and even share one of the sensors 13. It will therefore be immediately realized that the invention makes it possible, without reducing the quality of the measurements, to use fewer elements to perform detections so as to consume less energy and weigh less.

Figure 4:
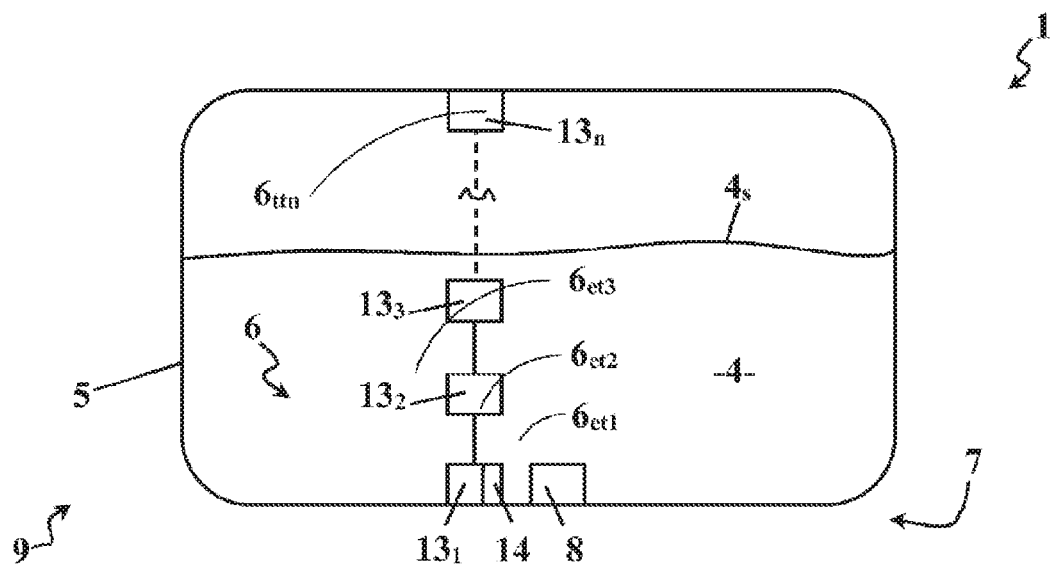
FIG. 4 is a cross-sectional schematic view of a third embodiment of a tank according to the invention.

In a third embodiment shown in FIG. 4, the tank 1 of fluid 4 comprises a body 5 arranged to receive the fluid 4. The tank 1 comprises a system 7 for extracting fluid from the tank 1 in order to be used in the motor vehicle 3 identical to that in the first and second embodiments.

Furthermore, the tank 1 comprises a system 9 for measuring several parameters of the fluid 4 in the tank 1 in order to control the use of the fluid 4 in the motor vehicle 3. Advantageously according to the invention, the measuring system 9 is arranged so as to capture acoustic waves 6 generated by another system, the main function of which is not that of emitting an acoustic wave 6, in order to determine, for example, the level and/or concentration of the fluid 4 in the tank 1. By way of non-limiting example, in the description below, the other system used will be the extraction system 7 in the fluid 4.

More precisely, the measuring system 9 makes it possible to capture the movements of molecules in the fluid 4, the variations of speed of molecules in the fluid 4, the variations of density in the fluid 4 or the variations of pressure in the fluid 4 caused by the acoustic waves 6 generated by the extraction system 7.

By way of non-limiting example, the acoustic waves 6 could thus be generated by the operation of the pump 8, its motor, the valve or any other element of the extraction system 7. It will therefore be understood that the measuring system 9 can be used when the extraction system 7 is in operation or controlling the operation of the extraction system 7 at a chosen moment.

In the example shown in FIG. 4, the third embodiment uses the pump 8 as a generator of acoustic waves 6. The measuring system 9 comprises several acoustic sensors $13_1$, $13_2$, $13_3$, $13_n$ mounted in the tank 1 in order to capture in several places the acoustic waves emitted $6_e$ by the extraction system 7 but also reflected $6_r$ by the upper surface $4_s$ of the fluid 4 or transmitted $6_t$ through the upper surface $4_s$ of the fluid 4.

The acoustic sensors $13_1$, $13_2$, $13_3$, $13_n$ are preferably mounted at a set distance and orientation in relation to one another, in order to enable the determination of the level of the fluid 4 in the tank 1 but also the determination of the concentration of the fluid 4 in several different places. In fact, the tanks 1 of the motor vehicle 3 are subject to the climatic variations of the environments passed through. Thus, depending on the nature of the fluid 4, freezing and thawing phases can occur. It will therefore be understood that the phase of the fluid 4 and, incidentally, the propagation of the acoustic waves 6 can be modified.

Advantageously according to the invention, the acoustic sensors $13_1$, $13_2$, $13_3$, $13_n$ are therefore preferably mounted at a set distance and orientation in relation to one another. By way of non-limiting example, the distribution of the acoustic sensors $13_1$, $13_2$, $13_3$, $13_n$ could be achieved in a circular, spherical, polygonal, prismatic or rectilinear manner. In the example in FIG. 4, the acoustic sensors $13_1$, $13_2$, $13_3$, $13_n$ are aligned at a constant distance in relation to one another between the bottom of the tank 1 and the upper part of the tank 1. Each acoustic sensor $13_1$, $13_2$, $13_3$, $13_n$ therefore detects the acoustic waves 6 generated by the extraction system 7.

The measuring system 9 also comprises a calculation module 14 arranged to determine the level and/or concentrations of the fluid 4. More precisely, the calculation module 14 determines, based on the distance and orientation between the acoustic sensors $13_1$, $13_2$, $13_3$, $13_n$, the type of fluid 4 and the time elapsed between the detections of the acoustic sensors $13_1$, $13_2$, $13_3$, $13_n$ for each acoustic wave generated by the extraction system 7, the level and concentrations of the fluid 4 in the tank 1.

Figure 5:
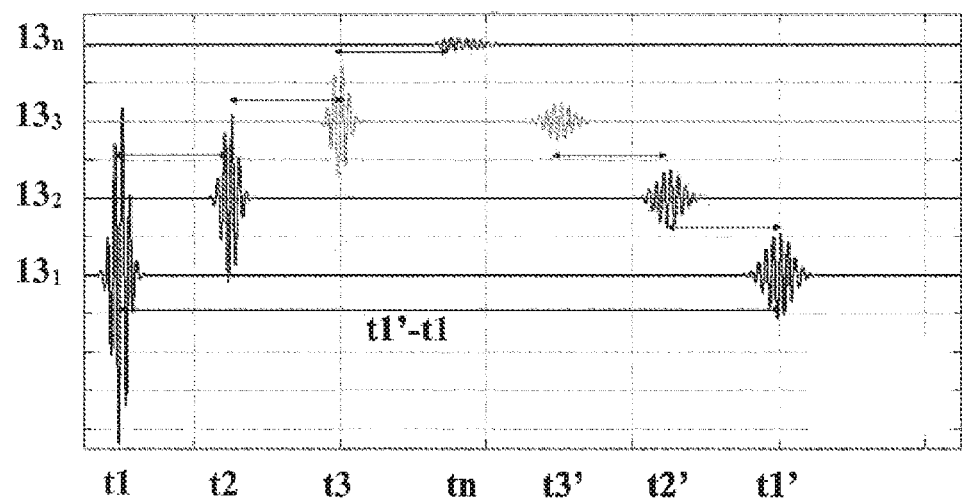
FIG. 5 is a representation of signals obtained by a measuring system according to the third embodiment of the invention.

FIG. 5 shows an example of signals advantageously obtained by the measuring system 9 according to the invention. The x-axis indicates the time elapsed and the y-axis shows the signals of each sensor $13_1$, $13_2$, $13_3$, $13_n$. Thus, at time t1, sensor $13_1$ detects a wave $6_{et1}$ emitted by the extraction system 7 with a very high intensity. At time t2, sensor $13_2$ detects the same wave $6_{et2}$ emitted by the extraction system 7 with a high intensity. At time t3, the sensor $13_3$ detects the same wave $6_{et3}$ emitted by the extraction system 7 with an average intensity. Lastly, at time tn, the sensor $13_n$ detects the same wave $6_{etn}$ transmitted through the upper surface $4_s$ of the fluid 4 with a lower intensity.

Then, at time t3', the sensor $13_3$ detects the same wave reflected by the upper surface $4_s$ of the fluid 4. At time t2', the sensor $13_2$ detects the same wave reflected by the upper surface $4_s$ of the fluid 4. Lastly, at time t1', the sensor $13_1$ detects the same wave reflected by the upper surface $4_s$ of the fluid 4.

It is therefore understood that an average value of the level of the fluid 4 in the tank 1 can be obtained by the calculation module 14 by the time t1'-t1 and the position of the sensor $13_1$ in the tank 1. In fact, the variation of the time t1'-t1 taken to travel back and forth makes it possible to monitor the variations in the level of the fluid 4.

Moreover, it is possible to model the concentrations of the fluid 4 between each sensor $13_1$, $13_2$, $13_3$, $13_n$ on the basis of their spatial distribution. In fact, the variation in the time taken to travel the fixed distance between each sensor $13_1$, $13_2$, $13_3$, $13_n$ makes it possible to monitor the variations in concentration of the fluid 4 between each sensor $13_1$, $13_2$, $13_3$, $13_n$.

Lastly, a more precise value of the level of the fluid 4 can be obtained using in a sequential manner the concentration of the fluid 4 and the time between each sensor $13_1$, $13_2$, $13_3$, $13_n$ by the calculation module 14. Clearly, a prior calibration depending on the arrangement of the tank 1, the distribution of the acoustic sensors $13_1$, $13_2$, $13_3$, $13_n$, the concentration of the fluid 4 and the type of fluid 4 enables the calculation module 14 to precisely measure the actual level and/or the actual concentrations and adapt itself to any variations in manufacture that may exists for the same type of tank 1.

The invention is not limited to the embodiments and variations presented and other embodiments and variations will appear obvious to a person skilled in the art. It is in particular possible for the acoustic waves to be generated by another system apart from the extraction system 7. This other system could thus be present or not present in the tank 1 such as, for example, the engine 2 of the motor vehicle 3 or the ambient noise around the tank 1.

Moreover, in the case of the third embodiment, it is obvious that the measuring device 9 could be applied to acoustic waves 6 emitted not by another system, the main function of which is not that of emitting an acoustic wave 6, but by the measuring device 9 itself, that is to say a dedicated sound emitter belonging to the measuring device 9.

Advantageously according to the invention, the measuring system 9 cannot be limited to the detection of the level and/or the detection of the concentration of the fluid 4 as explained above. Thus, as for example in the case of a tank 1 of a coolant fluid 4 like water, the measuring system 9 can be arranged to capture the acoustic waves 6 generated by another system, the main function of which is not that of emitting an acoustic wave 6, in order to determine, for example, the density and/or the pollution (degree of purity) and/or the conductivity of the coolant fluid 4 in the tank 1. This information is in fact required to control the reduction in the intake temperature of the air or air/fuel mixture of thermal engines, for example.

The invention claimed is:

1. A tank, comprising a body arranged to receive the fluid and a system for measuring a parameter of the fluid in the tank from an acoustic wave, the measuring system comprising at least one acoustic sensor designed to capture an acoustic wave, called noise, generated by another system, the main function of which is not that of emitting an acoustic wave.

2. The tank according to claim 1, wherein the other system is a system for extracting fluid out of the tank.

3. The tank according to claim 1, wherein the measuring system comprises a device for detecting the concentration of the fluid comprising an acoustic reflection element mounted at a fixed distance in relation to the other system, the acoustic sensor mounted between the reflection element and the other system in order to capture the acoustic waves generated by the other system and a calculation module arranged to determine the concentration of the fluid.

4. The tank according to claim 3, wherein the acoustic reflection element is formed by the body of the tank or a plate mounted in the tank.

5. The tank according to claim 3, wherein the calculation module comprises a means to determine, based on the fixed distance, the type of fluid and the time elapsed between the detections of each acoustic wave generated by the other system and its echo sent back by the reflection element, the concentration of the fluid.

6. The tank according to claim 1, wherein the measuring system comprises a device for detecting the level of the fluid comprising the acoustic sensor mounted in the tank in order to capture the acoustic waves generated by the other system and a calculation module arranged to determine the level of the fluid.

7. The tank according to claim 6, wherein the calculation module comprises a means to determine, based on the type of fluid and the time elapsed between the detections of each acoustic wave generated by the other system and on its echo reflected by the upper surface of the fluid, the level of the fluid in the tank.

8. The tank according to claim 6, wherein the measuring system comprises a first acoustic sensor mounted on the bottom of the tank, a second acoustic sensor mounted at the top of the tank, the calculation module comprising a means to determine, based on the distance between the first and second acoustic sensors, the type of fluid, the type of filling gas and the time elapsed between the detection of the first acoustic sensor and the second acoustic sensor for each acoustic wave generated by the other system, the level of the fluid in the tank.

9. The tank according to claim 1, wherein the measuring system comprises several acoustic sensors mounted in the tank in order to capture in several places the acoustic waves generated by the other system and a calculation module arranged in order to determine the level and/or the concentrations of the fluid.

10. The tank according to claim 9, wherein the acoustic sensors are mounted at a set distance and orientation in relation to one another, the calculation module comprising a means to determine, based on the distance and orientation between the acoustic sensors, on the type of fluid and the time elapsed between the detections of the acoustic sensors for each acoustic wave generated by the other system, the level and/or the concentrations of the fluid in the tank.

11. The tank according to claim 10, wherein the acoustic sensors are aligned at a constant distance from one another.

12. A motor vehicle comprising a tank (1) according to claim 1.

13. The motor vehicle according to claim 12, wherein the tank is a fuel tank for a thermal engine, a tank for additive for the fuel of a thermal engine, a tank for product for the depollution of the exhaust gas of a thermal engine or a fuel tank for a fuel cell.

14. A method for measuring a parameter of fluid contained in a tank for a motor vehicle, comprising:
- capturing an acoustic wave, called noise, propagating in the fluid and generated by a system, the main function of which is not that of emitting an acoustic wave;
- determining the parameter of the fluid based on a value measured on the basis of the captured wave.

* * * * *